United States Patent [19]
Bongert

[11] 3,970,552
[45] July 20, 1976

[54] METHOD AND MEANS FOR SEPARATION OF LIQUIDS FROM A MIXTURE OF SOLIDS AND LIQUIDS

[75] Inventor: Wilhelm Bongert, Bochum, Germany

[73] Assignee: Klockner-Humboldt-Deutz Aktiengesellschaft, Germany

[22] Filed: Aug. 30, 1974

[21] Appl. No.: 501,894

[52] U.S. Cl. .............................. 210/19; 210/73 R; 210/77; 210/195 R; 210/196; 210/388; 210/406; 210/512 R
[51] Int. Cl.² .......................................... B01D 33/00
[58] Field of Search ........... 209/250, 262, 312, 318, 209/321, 255, 258, 380, 425, 426, 468, 469, 495; 210/19, 20, 196, 388, 389, 297, 406, 416 R, 73 R, 77, 195 R, 512 R; 55/418

[56] References Cited
UNITED STATES PATENTS

| | | | |
|---|---|---|---|
| 809,861 | 1/1906 | Taylor, Jr. | 210/406 |
| 1,587,041 | 6/1926 | Secord | 55/418 X |
| 1,708,656 | 4/1929 | Bradshaw | 55/418 X |
| 2,415,268 | 2/1947 | Wendt | 210/389 |
| 2,462,878 | 3/1949 | Logue | 210/389 |
| 3,190,451 | 6/1965 | Holland | 210/406 X |
| 3,195,729 | 7/1965 | Kracklauer et al. | 210/388 X |
| 3,537,584 | 11/1970 | MacDonald | 210/196 |
| 3,570,670 | 3/1971 | Endo et al. | 210/388 X |
| 3,662,886 | 5/1972 | Kennedy, Jr. | 209/250 |

FOREIGN PATENTS OR APPLICATIONS

| | | | |
|---|---|---|---|
| 1,088,920 | 3/1955 | France | 210/388 |

Primary Examiner—Charles N. Hart
Assistant Examiner—Robert H. Spitzer
Attorney, Agent, or Firm—Hill, Gross, Simpson, Van Santen, Steadman, Chiara & Simpson

[57] ABSTRACT

The invention relates to a method for separation of liquids from a mixture of solid matter and liquids by supplying said mixture to a separation member which is permeable by liquid, simultaneously applying a vacuum to the underside of said separation member, and subjecting said separation member to vibrations. The invention also includes a device for carrying out said method.

8 Claims, 1 Drawing Figure

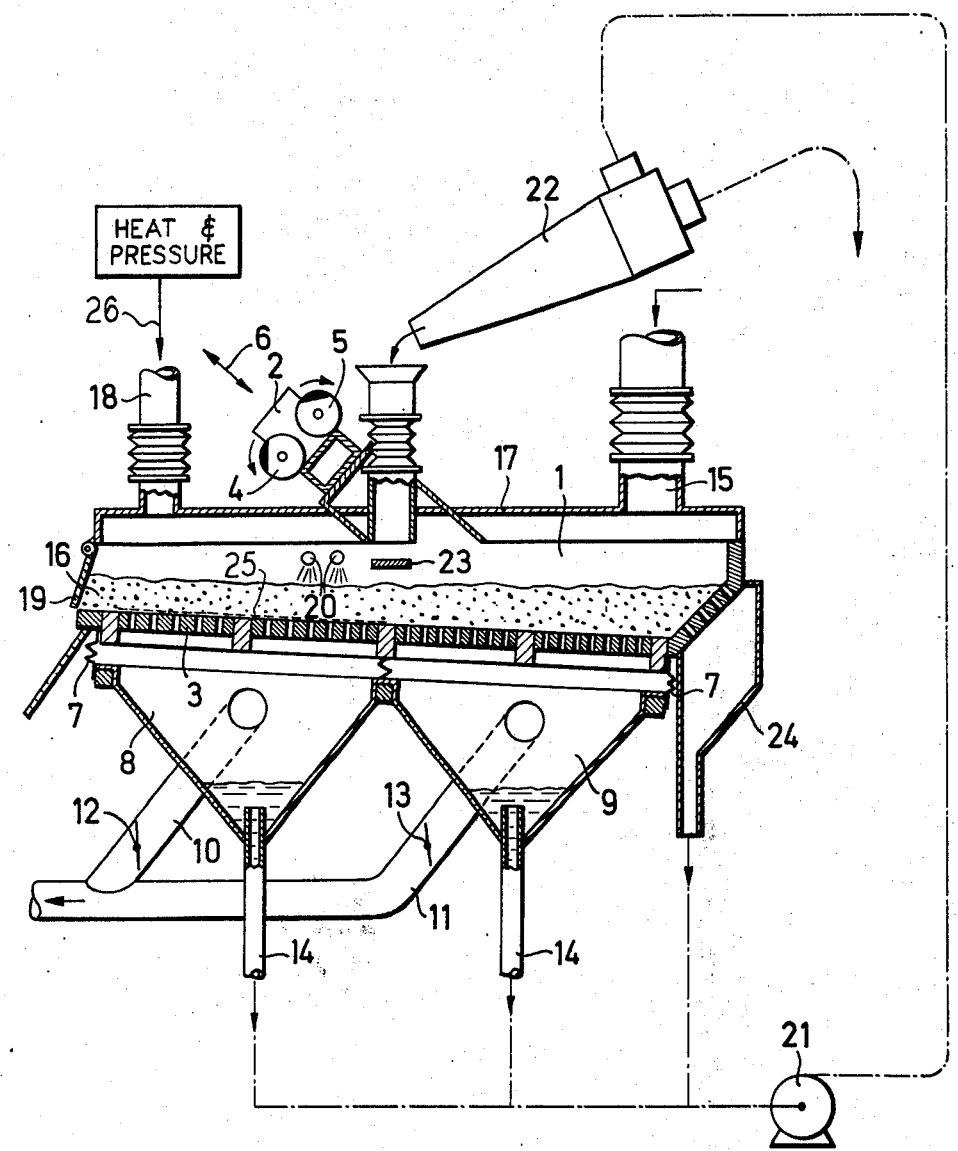

METHOD AND MEANS FOR SEPARATION OF LIQUIDS FROM A MIXTURE OF SOLIDS AND LIQUIDS

BACKGROUND OF THE INVENTION

This invention relates to a method of separating liquids from a mixture of solids and liquids by supplying the mixture to a substantially flat separation member that is permeable by liquids, and simultaneously applying a vacuum to the underside of said separation member.

It is known to remove liquids from mixtures of liquids and solids by supplying the mixture to the exterior surface of a rotating drum or the top surface of a table which in either case comprises a liquid permeable separation member and usually is provided with a filter cloth. From the interior side of the drum or from the underside of the table, respectively, the liquid is sucked away from the mixture through the application of a vacuum.

It is the object of the invention to provide a method and a device for carrying out said method, by means of which the separation of liquids from a mixture of liquids and solids can be further substantially improved. This is according to the inventive method accomplished by causing vibration of the separation member. The vibration movements of the separation member are transmitted to the mixture supported thereon, so that through the combined action of a vibration movement of the solid particles on the separation member and the vacuum applied beneath said member a very good separation of the liquid contained in the solid matter is achieved. This is presumably due to the fact that, as distinguished from conditions in known devices, because of the constant movement of the solid particles on the separation member caused by the vibration movements there is at all times formed a compact layer of material of uniform permeability on the separation member.

In practicing the invention it is provided that through the vibration movements of the separation member the solids retained thereon are given a preferably in one direction proceeding transport movement. Through this arrangement which structurally in its simplest embodiment according to the invention may assume the form of a transport trough or transport chute having a liquid permeable bottom, it is through the transmission of vibration movements to the separation member, which leads to the improvement oif the separation of the liquid from the solid matter, also achieved that the transportation of the solid matter on the separation member takes place. Hereby complicated means for the extraction of the solids are eliminated such as are required, for example, in drum or table filters for removal of the filter cakes.

In a further development of the inventive method it is arranged to have the vacuum applied to the underside of the separation member increase, as considered in the transport direction of the solids. Hereby it is advantageously achieved that in the charging zone with minimum vacuum and with full utilization of the reciprocation forces produced by the vibration movements, the removal of the liquid from the interspaces and capillaries of the layer of solids on the separation member can proceed without initial heavy compacting of the layer of solids in said zone. In this manner the quantities of liquid in the top surface region of said layer of material supplied to the separation member are in the first phase of the operation largely transferred to the vicinity of the separation member. Only with progressive withdrawal of the liquid through increase of the vacuum the liquid still retained in the pores of the layer of material and not removable by the effect of the reciprocation forces is withdrawn from the solids.

As a development of the inventive method it is further provided that at least a portion of the liquid passed through the separation member is supplied to an additional separation device in which a concentration of the residual solids in the liquid occurs in a portion of the liquid, said portion of the liquid being supplied to the separation member, preferably at a distance behind the supply place for the solid-liquids mixture counted in the transport direction of the solids. Hereby it is advantageously achieved that mixtures of solids and liquids having a high proportion of fine solids may also be separated without additional fine-pore filter medium and with the same device, and this even if the liquid withdrawn in the supply region initially contains a high proportion of fine solids. The fact is that due to the compacting of the layer of material on the separation member in the regions in which a considerable dewatering has already taken place, the spaces between the individual solid particles through the coaction of vibration and vacuum become clogged in such a way that the layer of material already by itself acts as a filtering medium, so that even fine solid particles of less size than the dimensions of the passage openings in the separation member are practically completely retained on the separation member.

The invention further relates to a device for carrying out the method which is provided with a separation member which is permeable by the liquid and on its upper side carries the mixture of solids, and liquids, while its underside is in communication with a device for producing a vacuum. According to the invention the separation member is adapted to vibrate and to this end connected with aa vibration drive device. Depending upon the direction in which the vibration is transmitted, such a device operated discontinuously, as for example in the case of vertical transmission of the vibrations to the separation member, or continuously. In this connection it is for the operation of no importance whether the separation member itself is caused to vibrate or whether the separation member for example is supported by a frame which in turn is vibrationally mounted and depending upon the nature of the mounting performs a rectilinear vibration movement or a vibration perpendicular to the separation member, such as a circular vibration movement.

In an advantageous embodiment of the inventive device the separation member is preferably flat and the vibrator means acts at an angle of 90° to the separation member, so that the transportation of the solid material retained on the separation member is effected in one direction. A device constructed in this manner is suitable for continuous operation in which the mixture of solids and liquids to be treated is supplied to one end of the separation member and under the influence of the vibration movements the dewatering as well as the transportation of the retained solids proceeds to the other end of the separation member.

In a preferable embodiment of the device the separation member is in the form of a transport channel or transport chute through the provision of side walls.

In a further advantageous embodiment of the inventive device there are beneath the separation member provided at least two separate vacuum chambers which are open towards the underside of the separation member, each of said vacuum chambers being separately connected with the device for producing the vacuum, preferably with the intermediary provision of control means. Through such an arrangement, it is possible to increase the vacuum toward the discharge end, counted in the transportation direction of the solids and in this manner, particularly in the region immediately before the discharge end of a device for example in the form of a transportation channel, to almost completely remove the liquid from the layer of solids.

In an advantageous embodiment of the invention the top side of the separation member is enclosed by a hood with the aid of which the space above the separation member is in communication with a device for producing over pressure and/or for supplying heating media. Through this measure the dewatering effect may be further enhanced.

The method according to the invention will now be described with reference to an exemplary structure from which further details of the invention may be derived.

DRAWINGS

The single FIGURE of the drawings is a vertical sectional view shown somewhat schematically of a mechanism embodying the principles of the present invention.

DESCRIPTION

The embodiment shown is in accordance with a preferred form of the invention constructed as a transport chute. It comprises a frame 1 which is mounted for vibration on springs, rubber cushions or the like (not shown) and connected with a vibration drive means, or motor, 2 for example arranged on the top side of said frame and at an angle to the longitudinal axis thereof. The bottom of the transport chute which forms the separation member 3, is according to the invention constructed as a sieve.

The vibration drive means consists, for example, of two oppositely rotating eccentrics 4 and 5 which induce vibrations in the direction of the arrow 6 to the frame and thereby to the separation member. Instead of the drive means shown, it is possible to use magnetic vibrators in a similar manner, or a single rotating eccentric which in the case of suitable resilient support of the frame induces to the separation member a swinging movement which is approximately circular and lies in a plane that is perpendicular to the separation member.

Below the separation member and connected with the vibrating frame only by the intermediary of resilient sealing elements 7 there are two vacuum chambers 8 and 9, each connected with a device (not shown) for producing vacuum through a separate conduit 10 and 11, respectively. In said conduits there are according to the invention provided throttle flaps 12 and 13 by means of which different amount of vacuum may be provided in the two vacuum chambers through suitable setting of said throttle flaps. The bottom of the two vacuum chambers is in both cases provided with a conduit 14 for the withdrawal of the liquids.

The mixture of solids and liquids is supplied to the separation members at one end thereof through a suitable, diagrammatically indicated supply means 15. Under the influence of the vibration movement which causes the transport of the solids in the direction toward the discharge end 16 of the chute, and of the vacuum applied to the underside of the separation member, the liquid is removed from the mixture of solids and liquids. In a preferred embodiment of the invention it is advantageous to cover at least a portion of the sieve-shaped separation member with a filtering means, for example a filter cloth 25. Said additional filtering means may in dependence upon the nature and grain composition of the solids in the mixture suitably be arranged in the rear region, that is, for example, in the region of the vacuum chamber having the highest vacuum, in order to retain the finest components against the strong suction effect in said area. The material which in this manner has been freed from all liquid except the remaining moisture on the surface of the solid particles, is thrown off at the discharge end of the device.

In the embodiment shown the upper side of the separation member 3 is enclosed by means of a hood 17 through which the space above the separation member by means of suitable inlet connection conduits 18 is in communication with a device for producing over pressure and/or supplying media. For example, a blower heater may be provided shown schematically by the arrowed line 26 which directs a flow of pressurized heated air in through the conduit 18. In this case it is advantageous to provide the discharge end of the device with an outlet control device which in the drawing is shown as a pivotally or resiliently supported flap 19 by means of which it is to a large extent prevented that the supplied pressurized air or the introduced heating media escape unused through the discharge opening.

Above the separation member, for example in its middle region, there are according to the invention also provided additional means 20 for introduction of treatment media, particularly washing liquids. Said means are for example in the form of one or more transversely to the transport direction above the separation member extending tubes with a plurality of nozzle openings, as shown in the drawing, or in the form of sprinklers or the like. Through these arrangements it is advantageously possible, for example after separation of a mother liquid from the mixture of solids and liquids, such as an acid or caustic, to subsequently wash the solids with a neutral liquid, for example water. Thanks to the fact that the vacuum chambers at the same time serve as collection housings for the separated liquids, it is also in such a method feasible to discharge different liquids separately.

In the case of a solids-liquids mixture having a high proportion of a fine-grained material it is of advantage to pass the withdrawn liquid by means of a pump 21 to a second separation device, such as a concentration cyclone 22, from which the main portion of the liquid is withdrawn and passed to a clarification pool while a preferably smaller portion together with the solids separated out in the cyclone is again supplied to the vibrating separation member. This is preferably carried out in the middle region. For this purpose there are above the layer of material on the separation member and suitably below the inlet opening for the liquid flow from the second separation device provided distribution means in the form of baffle plates 23 or the like by means of which, on one hand, the mixture introduced into said middle region is distributed over the entire width of the transport chute and, on the other hand, thanks to the newly added mixture of liquids and solids the layer of solids already lying on the separation member and largely dewatered is not flushed away. In this manner it is also achieved that the layer of solids lying on the separation member and already largely freed from liquid simultaneously functions as a filter medium. In this connection it is also advantageous if, as according to one embodiment of the invention, the size of the openings for the liquid in the separation member decreases in the transport direction of the solids.

Particularly in the case of a high liquid content of the supplied mixture of solids and liquids it is according to one form of the invention of advantage to arrange in the area of the supply place an additional preferably vacuum-free device 24 for removal of liquids, for example in the form of a sieve or an overflow weir.

According to the invention the vibration amplitude of the separation member is not to exceed 20 mm since otherwise the material on the separation member is torn-up and thereby the uniform dewatering detrimentally influenced.

I claim as my invention:

1. A method for the separation of liquids from a solid liquid mixture comprising the steps:
    depositing a solids liquid mixture on a separating oscillating conveyor surface permeable to the liquid with the material moving in a conveying direction;
    applying a vacuum on the undersurface of the separating surface;
    and increasing the vacuum in the conveying direction of material movement on the separating surface.

2. A method for the separation of liquids from a solid liquid mixture in accordance with the steps of claim 1:
    including depositing an additional solids liquid mixture onto the separating surface at a second location downstream relative to said conveying direction relative to the first location where the mixture is first deposited onto the separating surface.

3. A method for the separation of liquids from a solid liquid mixture in accordance with the steps of claim 1:
    including oscillating said separating surface at a vibrating amplitude of 20 mm.

4. A device for the separation of liquids from a mixture of solids and liquids comprising in combinatioin:
    means defining a closed separation chamber having a first separation zone and a second separation zone;
    a generally horizontally extending permeable separation surface along the bottom of said chamber and having openings in said surface of a size to permit penetration of liquid, the openings in said first zone being larger than the openings in said second zone;
    a first vacuum chamber beneath said first zone;
    means for controlling the vacuum in said first chamber;
    a second vacuum chamber beneath said second zone;
    means for controlling the vacuum in said second chamber to be higher than the vacuum in said first chamber;
    means for supplying a mixture of solids and liquid onto said separation surface in said first zone;
    first means for collecting liquid beneath said first zone;
    second means for collecting said liquid beneath said second zone;
    a recirculating conduit means connected to said first and second collecting means for delivering material from the collecting means to said chamber between said zones onto material above said surface;
    a cyclone separator in said circuit for separation of liquid from the material returned to said material above said surface;
    a vibrating means connected to vibrate said surface and to cause movement of the material from said first to said second zone;
    a discharge opening at a discharge end of the second zone;
    means to control the flow through said discharge end;
    means for directing heat into the closed chamber above the surface;
    and means for pressurizing said chamber above the surface.

5. A device for the separation of liquids from a mixture of solids and liquids comprising in combination:
    an oscillating conveyor having a generally horizontal permeable separating surface for receiving a solids liquid mixture on its upper surface in a conveying direction;
    said permeable separating surface having openings which decrease in size in the conveying direction;
    means for feeding onto that portion of said separating surface which has the larger openings a mixture of solids and liquid;
    means beneath said surface for the production of a vacuum drawing liquid downwardly from the solids with said vacuum increasing along said surface in said conveying direction;
    and means on the underside of the separating surface for the withdrawal of liquid which passes downwardly.

6. A device for the separation of liquids from a mixture of solids and liquids constructed in accordance with claim 5:
    including a sieve positioned to receive the liquid passing downwardly from said solids to the withdrawal means on the underside of the separating surface.

7. A device for the separation of liquids from a mixture of solids and liquids constructed in accordance with claim 5:
    including a closed chamber above the separating surface;
    and means for pressurizing said chamber.

8. A device for the separation of liquids from a mixture of solids and liquids constructed in accordance with claim 7:
    including a closed chamber above said separating surface;
    and means connected to the chamber for supplying a heated fluid to said chamber.

* * * * *